(12) United States Patent
Yasuoka

(10) Patent No.: US 10,712,822 B2
(45) Date of Patent: Jul. 14, 2020

(54) INPUT SYSTEM FOR DETERMINING POSITION ON SCREEN OF DISPLAY DEVICE, DETECTION DEVICE, CONTROL DEVICE, STORAGE MEDIUM, AND METHOD

(71) Applicant: FUJITSU TEN LIMITED, Kobe-shi, Hyogo (JP)

(72) Inventor: Hidenori Yasuoka, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 0 days.

(21) Appl. No.: 15/632,783

(22) Filed: Jun. 26, 2017

(65) Prior Publication Data

US 2018/0032138 A1 Feb. 1, 2018

(30) Foreign Application Priority Data

Jul. 26, 2016 (JP) .................................. 2016-146433

(51) Int. Cl.
| | |
|---|---|
| *G06F 3/01* | (2006.01) |
| *G06F 3/044* | (2006.01) |
| *B60K 35/00* | (2006.01) |
| *G06F 3/0488* | (2013.01) |

(52) U.S. Cl.
CPC .............. *G06F 3/016* (2013.01); *B60K 35/00* (2013.01); *G06F 3/044* (2013.01); *G06F 3/04886* (2013.01); *B60K 2370/1438* (2019.05); *B60K 2370/1468* (2019.05); *B60K 2370/52* (2019.05); *G06F 2203/04809* (2013.01)

(58) Field of Classification Search
None
See application file for complete search history.

(56) References Cited

U.S. PATENT DOCUMENTS

| | | | | |
|---|---|---|---|---|
| 2012/0110511 | A1* | 5/2012 | Howard | G01C 21/36 715/835 |
| 2013/0162564 | A1* | 6/2013 | Adachi | G06F 3/041 345/173 |
| 2014/0292695 | A1* | 10/2014 | Wakamoto | G06F 3/1423 345/173 |
| 2014/0362014 | A1* | 12/2014 | Ullrich | G06F 3/0488 345/173 |
| 2017/0147105 | A1* | 5/2017 | Kwon | B60K 35/00 |

FOREIGN PATENT DOCUMENTS

| | | | |
|---|---|---|---|
| JP | H11-327756 A | 11/1999 | |
| JP | 2004-334317 A | 11/2004 | |
| JP | 2006-293945 A | 10/2006 | |
| KR | 20150162736 | * 11/2015 | ............. G06F 3/041 |

* cited by examiner

*Primary Examiner* — Ifedayo B Iluyomade
(74) *Attorney, Agent, or Firm* — Oliff PLC

(57) ABSTRACT

Provided with an input system including: a detection device that contains a detection sensor which detects a user operation and is arranged apart from a display device, and an output circuit which outputs detected information indicating the user operation detected by the detection sensor; an input device which inputs the detected information; and a control device that contains a control means implemented by a programmed processor which, when the user operation is judged to indicate an operation performed at a prescribed position on the basis of the detected information input by the input device, determines the display position of an indicator on a screen of the display device as a specific position.

12 Claims, 10 Drawing Sheets

INPUT SYSTEM FOR DETERMINING POSITION ON SCREEN OF DISPLAY DEVICE, DETECTION DEVICE, CONTROL DEVICE, STORAGE MEDIUM, AND METHOD

CROSS-REFERENCE TO RELATED APPLICATIONS

This application is based upon and claims the benefit of priority of the prior Japanese Patent Application No. 2016-146433, filed on Jul. 26, 2016, the entire contents of which are incorporated herein by reference.

BACKGROUND OF THE INVENTION

1. Field of the Invention

The present invention relates to an input system for determining a position on a screen of a display device, a detection device, a control device, a storage medium, and a method.

2. Description of the Related Art

Conventionally, a variety of input devices have been proposed as operating units which input operations to an electronic device.

For example, Japanese Laid-open Patent Publication No. 2006-293945 proposes the use of an operation panel including irregular detection regions on its external surface in an input device which inputs operations to a recording/reproducing device that performs graphic editing.

In addition, Japanese Laid-open Patent Publication No. H11-327756 proposes a touch panel display which includes protruded buttons.

Further, Japanese Laid-open Patent Publication No. 2004-334317 proposes a touch panel device which, on a touch panel display of a computer, is capable of accurately determining the coordinates of a mouse cursor position even when a peripheral part of the touch panel is touched.

In this manner, it is required that an input device allows its user to easily feel the input device by touch or to accurately input operations for operating an electronic device with a finger while looking at the display screen of the electronic device.

Moreover, input devices which input operations are also used in onboard devices having a display device that are mounted on vehicles such as automobiles.

For example, a user driving a vehicle sometimes operates a navigation function of an onboard device while looking at the screen of a display device.

As described above, it is thus required that an input device allows a user of the onboard device to easily feel the input device by touch or to accurately input operations.

When a user driving a vehicle looks at an input device or visually checks on the screen if a desired operation has been performed, his/her line of sight shifts from ahead to the inside of the vehicle; therefore, such a period is desired to be shortened as much as possible.

SUMMARY OF THE INVENTION

An object of the present specification is to provide: an input system capable of easily determining a position on a screen of a display device; a detection device; a control device; a computer-readable non-transitory storage medium; and a method.

Means for Solving the Problems

According to the input system disclosed in the present specification, the input system includes: a detection device that contains a detection sensor which detects a user operation and is arranged apart from a display device, and an output circuit which outputs detected information indicating the user operation detected by the detection sensor; an input device which inputs the detected information; and a control device that contains a control means implemented by a programmed processor which, when the user operation is judged to indicate an operation performed at a prescribed position on the basis of the detected information input by the input device, determines the display position of an indicator on a screen of the display device as a specific position.

According to the detection device disclosed in the present specification, the detection device includes: a detection sensor which detects a user operation and is arranged apart from a display device; and an output circuit which outputs detected information indicating the user operation detected by the detection sensor, wherein the detection device is configured such that, when the user operation is judged to indicate an operation performed at a prescribed position on the basis of the detected information input by an input device, the display position of an indicator on a screen of the display device is determined as a specific position.

According to the control device disclosed in the present specification, the control device includes: an input device which inputs detected information output by a detection device that contains a detection sensor which detects a user operation and is arranged apart from a display device and an output circuit which outputs detected information indicating the user operation detected by the detection sensor; and a control means implemented by a programmed processor which, when the user operation is judged to indicate an operation performed at a prescribed position on the basis of the detected information input by the input device, determines the display position of an indicator on a screen of the display device as a specific position.

According to the computer-readable non-transitory storage medium disclosed in the present specification, the computer-readable non-transitory storage medium causes a computer to execute a process of determining the display position of an indicator on a screen of a display device as a specific position when a user operation is judged to indicate an operation performed at a prescribed position on the basis of detected information output by a detection device that contains a detection sensor which detects the user operation and is arranged apart from the display device and an output circuit which outputs the detected information indicating the user operation detected by the detection sensor.

According to the method disclosed in the present specification, the method determines the display position of an indicator on a screen of a display device as a specific position when a user operation is judged to indicate an operation performed at a prescribed position on the basis of detected information output by a detection device that contains a detection sensor which detects the user operation and is arranged apart from the display device and an output circuit which outputs the detected information indicating the user operation detected by the detection sensor.

According to the above-described input system disclosed in the present specification, a position on the screen of the display device can be easily determined.

In addition, according to the above-described detection device disclosed in the present specification, a position on the screen of the display device can be easily determined.

Further, according to the above-described control device disclosed in the present specification, a position on the screen of the display device can be easily determined.

Still further, according to the above-described computer-readable non-transitory storage medium disclosed in the present specification, a position on the screen of the display device can be easily determined.

Yet still further, according to the above-described method disclosed in the present specification, a position on the screen of the display device can be easily determined.

DETAILED DESCRIPTION OF THE PREFERRED EMBODIMENT

Figure 1:
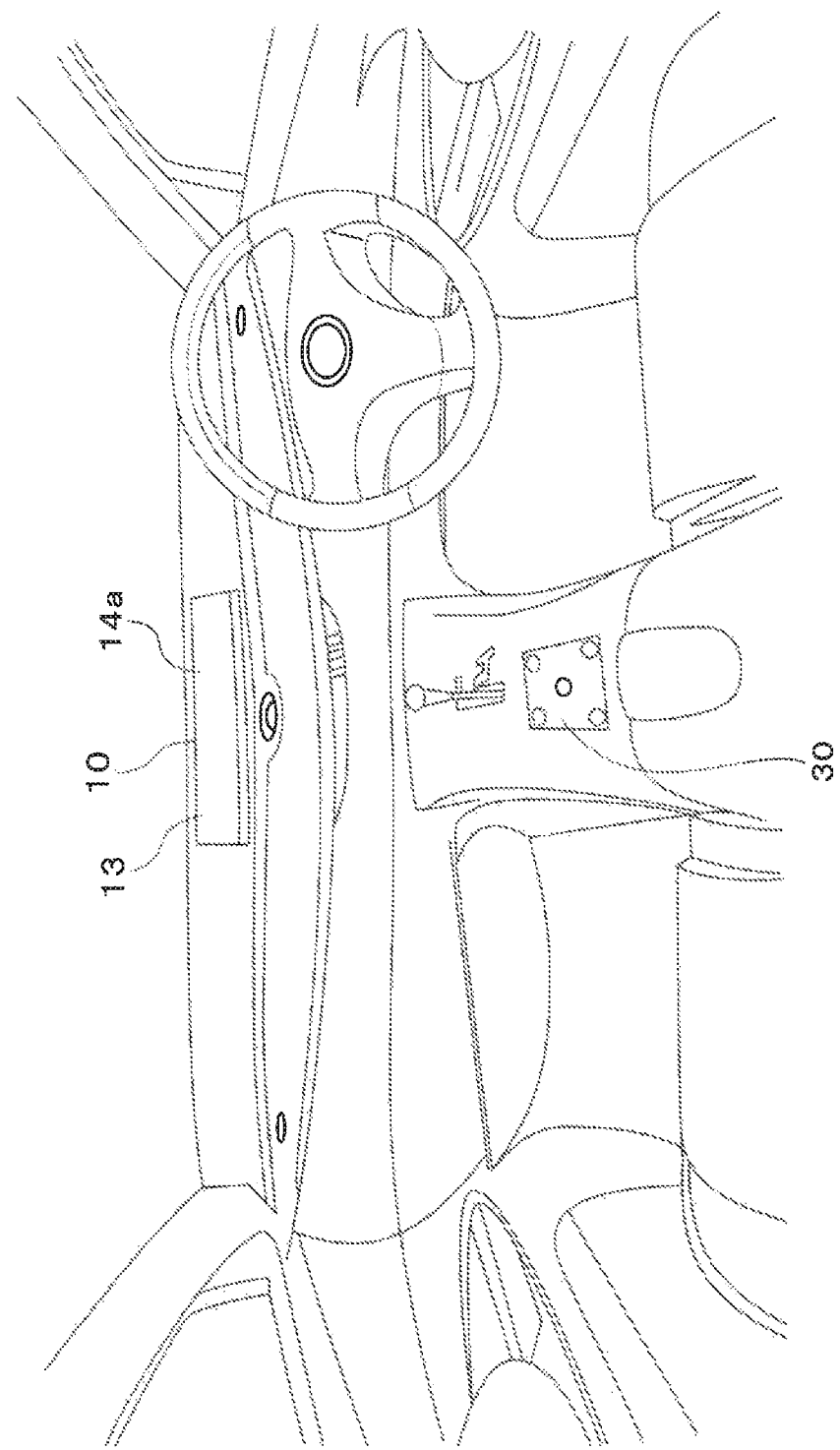
FIG. 1 illustrates the compartment of a vehicle where an onboard device including the input system disclosed in the present specification is arranged.

Embodiments of an onboard device that includes the input system disclosed in the present specification will now be described referring to the drawings. It is noted here, however, that the technical scope of the present invention is not restricted to the below-described embodiments and extends to the inventions determined in Claims and equivalents thereof.

Figure 2:
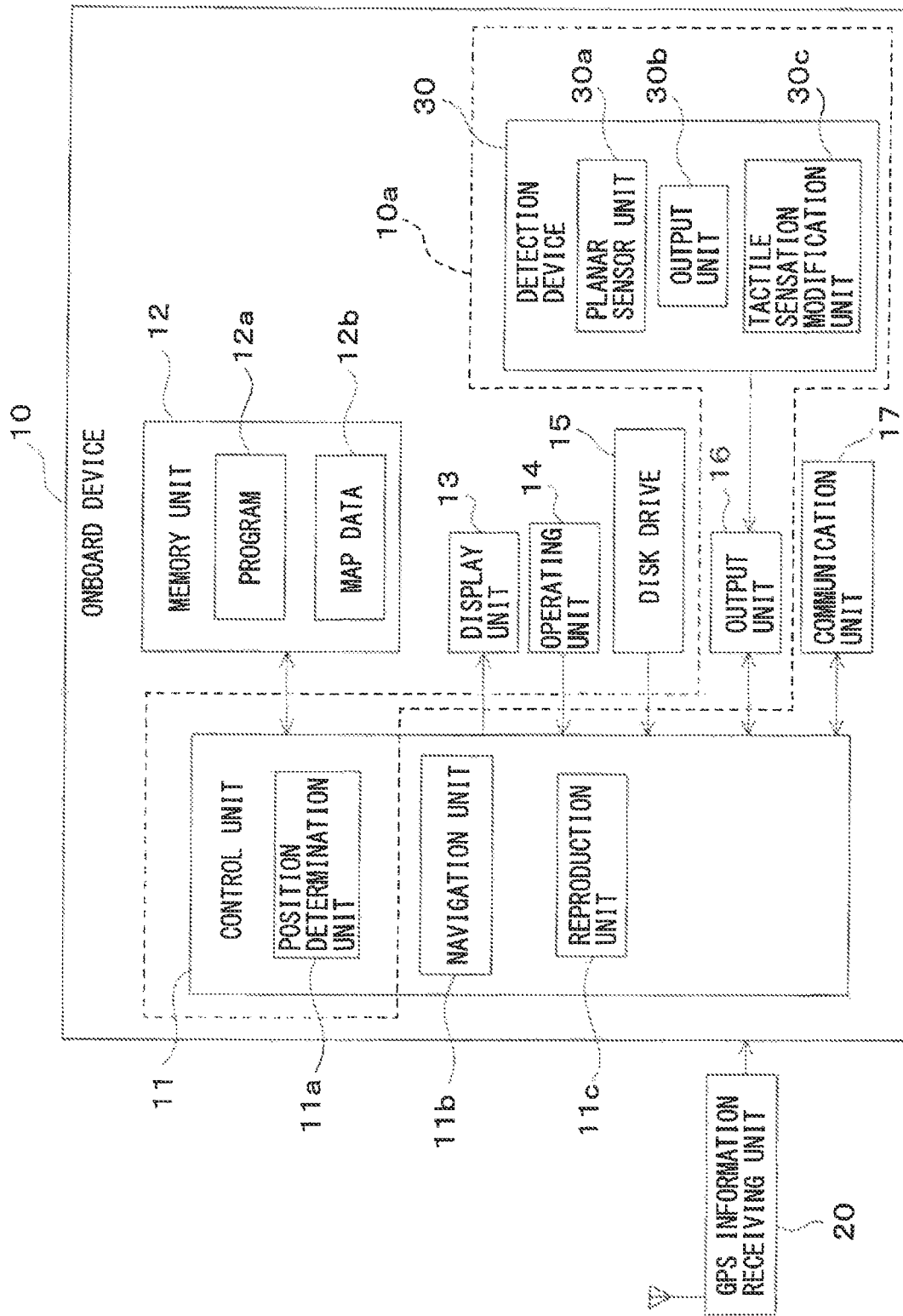
FIG. 2 is a block diagram of the onboard device including the input system disclosed in the present specification.
Figure 3:
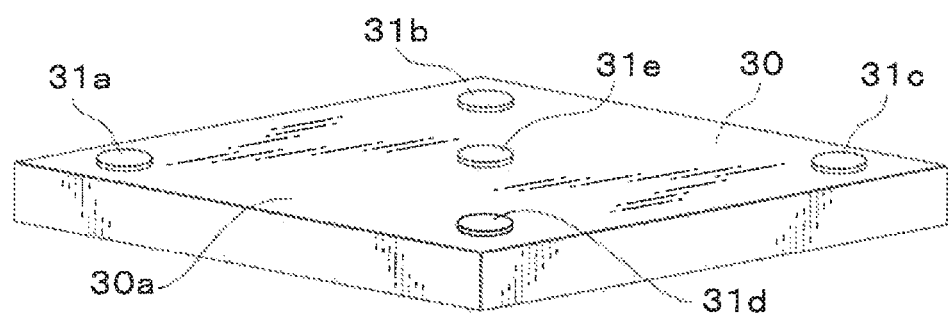
FIG. 3 illustrates a planar sensor unit.
Figure 4:
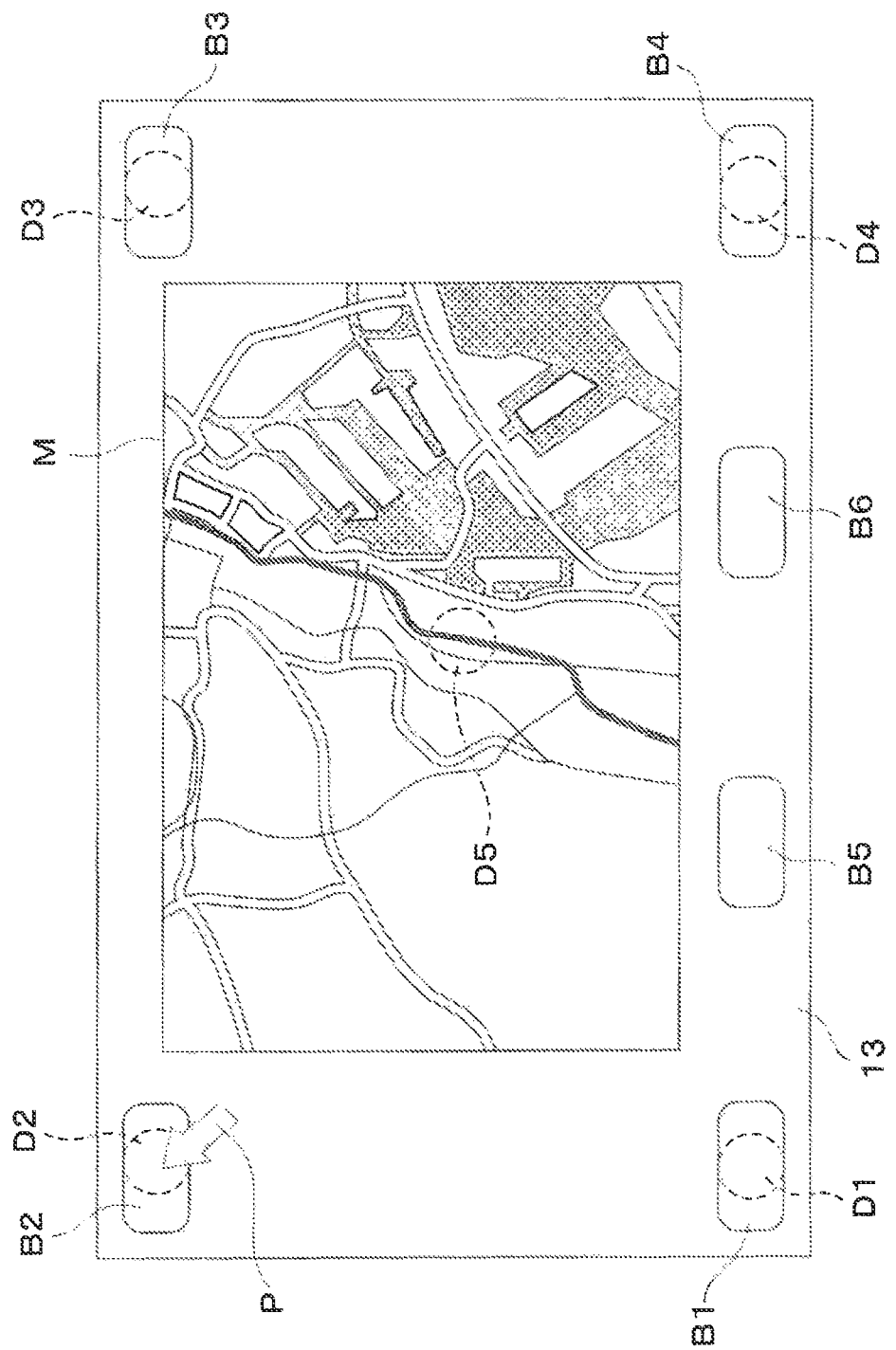
FIG. 4 illustrates a screen of a display unit.

FIG. 1 illustrates the compartment of a vehicle where an onboard device including the input system disclosed in the present specification is arranged. FIG. 2 is a block diagram of the onboard device including the input system disclosed in the present specification. FIG. 3 illustrates a planar sensor unit. FIG. 4 illustrates a screen of a display unit.

An onboard device 10 includes: a control unit 11; a memory unit 12; a display unit (display device) 13; an operating unit 14; a disk drive 15; an input unit (input device) 16; and a communication unit 17.

The display unit 13 of the onboard device 10 is mounted on a vehicle in a fixed state on the dashboard of the vehicle front compartment such that its screen can be easily viewed by a user.

The onboard device 10 also includes a detection device 30 which inputs user operations. The detection device 30 is arranged in the center console behind the shift gear. The detection device 30 and the display unit 13 are mechanistically separated from each other; however, they are connected through wire communication or wireless communication, and the display unit 13 is configured to be remotely operable using the detection device 30. The user driving the vehicle can operate the detection device 30 using, for example, his/her left hand. The detection device 30 inputs a user operation performed on an operation screen displayed on the display unit 13. The user can operate the onboard device 10 using the detection device 30.

The control unit 11 includes one or more programmed processors and a peripheral circuit. The control unit 11 controls the hardware components of the onboard device 10 and performs various processings in accordance with a prescribed program 12a stored in the memory unit 12 in advance, and the memory unit 12 is utilized for temporarily saving the data generated during the processings.

The memory unit 12 may include a semiconductor memory such as a random-access memory (RAM) or a read-only memory (ROM), or a non-volatile memory such as a magnetic disk or a flash memory. Further, the memory unit 12 may use the disk drive 15 as a drive capable of reading out the prescribed program 12a stored in a non-transitory storage medium. The non-transitory storage medium is computer-readable or processor-readable.

The display unit 13, which is controlled by the control unit 11, is capable of displaying various information. As the display unit 13, for example, a liquid crystal display can be used. The onboard device 10 may be configured to display various information by projecting an image on the windshield or the like of the vehicle. In such a case, a projection unit which projects an image and the windshield or the like on which the image are projected constitute the display unit, and the region of the windshield or the like where the image is projected corresponds to the screen.

The operating unit 14, which is operated by the user, is capable of inputting operations. The onboard device 10 includes a touch panel 14a as the operating unit 14 (see FIG. 1). The touch panel 14a is arranged on the screen of the display unit 13 and, when the user touches the touch panel 14a, the control unit 11 judges the content of the user operation on the basis of the coordinates of the position on the touch panel 14a touched by the user.

The disk drive 15, which houses a disk-form storage medium and is controlled by the control unit 11, reads out the contents wrote in the storage medium, such as music data or graphic data, and outputs the thus read-out data to the control unit 11.

The input unit 16 inputs the detected information output by the detection device 30 and then outputs the thus input detected information to the control unit 11.

The communication unit 17 communicates with an in-vehicle local area network installed in the vehicle.

Further, to the onboard device 10, the positional information indicating the vehicle's position is input from a GPS information receiving unit 20 mounted on the vehicle. The GPS information receiving unit 20 receives GPS radio waves transmitted by GPS satellites to determine the vehicle's position and outputs the vehicle positional information to the onboard device 10.

The onboard device 10 can be constituted by, for example, a computer or a state machine.

The control unit 11 includes: a position determination unit 11a; a navigation unit 11b; and a reproduction unit 11c. These units of the control unit 11 are each a function module realized by, for example, a computer program executed on the processor of the control unit 11.

When the user operation is judged to indicate an operation performed at a prescribed position on the basis of the detected information input by the input unit 16, the position determination unit 11a determines the display position of an indicator on the screen of the display unit 13 as a specific position. Examples of the indicator include a cursor, a pointer, and a selection frame (focus). The detection device 30 cooperates with the position determination unit 11a of the control unit 11 and the input unit 16 of the onboard device to realize the function of an input system 10a of determining the specific position on the screen of the display unit 13 on the basis of the operation applied by the user to the detection device 30a. The operations of the position determination unit 11a will be described later.

The navigation unit 11b is a function module realized by execution of the prescribed program 12a using map data 12b and has a navigation function which performs route guidance to a destination on the basis of the vehicle's current location acquired from the GPS information receiving unit 20. The navigation unit 11b generates a map image depicting the vehicle's surrounding area as well as voice guidance information on the basis of the map data 12b stored in the memory unit 12 and the vehicle's location. When a destination is set by the user, the navigation unit 11b derives a route to the destination from the vehicle's location at the moment and overlays the route on the map image. The map image generated by the navigation unit 11b is displayed on the display unit 13.

The reproduction unit 11c is a function module realized by execution of the program 12a and reads out the contents, such as music data or graphic data, written in the disk-form storage medium housed in the disk drive 15.

Next, the detection device 30 will be described in more detail.

The detection device 30 includes: a planar sensor unit (planar touch sensor) 30a, which is capable of detecting a position touched in its plane; and an output unit 30b, which outputs the user operation-indicating information detected by the planar sensor unit 30a. The output unit (output circuit) 30b outputs the thus detected information indicating the position touched on the planar sensor unit 30a to the input unit 16 of the onboard device 10. On the basis of this detected information, the position determination unit 11a determines the position of the user operation on the planar sensor unit 30a and, when the user operation is judged to indicate an operation performed at a prescribed position, the position determination unit 11a determines a specific position on the screen of the display unit 13 on the basis of the prescribed position on the planar sensor unit 30a.

The detection device 30 also includes a tactile sensation modification unit 30c, which modifies the tactile sensation of a prescribed region on the planar sensor unit 30a to be different from that of other regions.

As illustrated in FIG. 3, the detection device 30 includes, as the tactile sensation modification unit 30c: protrusions 31a to 31e which are arranged in prescribed regions (at prescribed positions) on the planar sensor unit 30a and modified such that the tactile sensation of these prescribed regions of the planar sensor unit 30a is different from that of other regions.

The planar sensor unit 30a may have a flat surface or a curved surface. The shape of the planar sensor unit 30a in a plan view is not particularly restricted; however, in the present embodiment, the planar sensor unit 30a has a tetragonal shape.

The planar sensor unit 30a is capable of detecting the position touched by a user operation.

The method of detecting the touched position on the planar sensor unit 30a is not particularly restricted and, for example, a capacitance method can be employed. The detection device 30 detects the presence and position of a capacitor formed by the planar sensor unit 30a and a finger of the user on the planar sensor unit 30a as a change in capacitance.

Since the position determination unit 11a detects the presence of such a capacitor in the detection device 30 as capacitance distribution over the entire surface of the planar sensor unit 30a on the basis of the detected information, the position of the planar sensor unit 30a in contact with a finger of the user is determined by computing the center of the distribution.

The detection device 30 has five protrusions 31a to 31e as the tactile sensation modification unit 30c. These five protrusions 31a to 31e are arranged at the four corners and center of the planar sensor unit 30a. The protrusions 31a to 31e each protrude outwardly from the surface of the planar sensor unit 30a. The user, while sliding his/her fingertip on the planar sensor unit 30a, can recognize that the fingertip has come into contact with the protrusions 31a to 31e by touching them. The number and arrangement of the protrusions are not restricted to the above-described mode and can be set as appropriate in accordance with the intended use.

Since the planar sensor unit 30a is arranged underneath the protrusions 31a to 31e as well, the detection device 30 is also capable of detecting that the fingertip is positioned at any of the protrusions 31a to 31e.

On the basis of a prescribed operation applied to any one of the protrusions 31a to 31e arranged in the prescribed regions of the planar sensor unit 30a, the position determination unit 11a of the control unit 11, by remote operation, determines a specific position on the screen of the display unit 13 and moves a pointer P to the thus determined specific position on the screen.

The user can also move the pointer P to a desired position by sliding his/her fingertip on the planar sensor unit 30a.

FIG. 4 illustrates the screen of the display unit.

In FIG. 4, the navigation unit 11b of the onboard device 10 executes the navigation function, and the navigation operation buttons B1 to B6 are displayed on the display unit 13 along with a map M.

Specific positions on the screen of the display unit 13, which are determined on the basis of prescribed operations applied to the five protrusions 31a to 31e of the planar sensor unit 30a, are set in advance. In the example illustrated in FIG. 4, a mark D1 is displayed at the specific position on the screen of the display unit 13 which is determined on the basis of a prescribed operation applied to the protrusion 31a. Similarly, marks D2, D3, D4 and D5 are displayed at the specific positions on the screen that correspond to the protrusions 31b, 31c, 31d and 31e, respectively. In this manner, the marks D1 to D5 on the screen have the same positional relationship as the five protrusions 31a to 31e of the planar sensor unit 30a. Based on these marks D1 to D5 on the screen, the user can recognize the specific position to which the pointer P is moved by the operations of the protrusions 31a to 31e, with the specific position being displayed on the screen of the display unit 13.

Once the user performed a prescribed operation on any of the protrusions 31a to 31e, the position determination unit 11a determines the touched position on the planar sensor unit 30a on the basis of the detected information. When the touched position is any one of the protrusions 31a to 31e that are prescribed regions on the planar sensor unit 30a, the position determination unit 11a determines a specific position on the screen of the display unit 13 on the basis of the positions of the protrusions 31a to 31e on the planar sensor unit 30a. Then, the position determination unit 11a moves the pointer P to the thus determined position of any one of the marks D1 to D5 on the screen.

The example of FIG. 4 illustrates a state in which the user performed a prescribed operation on the protrusion 31b and the pointer P was consequently moved to the thus determined position of the mark D2 on the screen.

Since the user understands the positional relationship between the respective protrusions 31a to 31e and marks D1 to D5 on the screen, the user selects and operates any of the protrusions 31a to 31e that makes the pointer P move to a specific position near the desired operation button on the screen.

Further, since the user can recognize the desired protrusion 31a to 31e by sliding his/her fingertip on the planar sensor unit 30a, the user can operate the planar sensor unit 30a with his/her eyes directed ahead, without turning the line of sight to the planar sensor unit 30a.

On the screen of the display unit 13, in a normal user operation of moving an indicator (e.g., a cursor, a pointer or a selection frame) (normal indicator operation), the indicator is moved in accordance with the amount of the user operation. On the other hand, in a special operation of calling the indicator to a specific position on the screen (indicator calling operation), when the user operation indicates an operation applied to a prescribed position on the planar sensor unit 30a, the indicator is moved to the specific position on the screen of the display unit 13 that corresponds to the prescribed position, i.e. specific absolute position.

Subsequently, the user can perform a prescribed operation for navigation by operating the operation button B2 using the touch panel 14a. The operation of the operation button B2 may also be performed using the planar sensor unit 30a. In this case, the operation of the operation button B2 can be realized as a prescribed operation on the planar sensor unit 30a or arrangement of an operation confirmation button (not illustrated) on the detection device 30.

The prescribed operations to be performed on the respective protrusions 31a to 31e of the planar sensor unit 30a are not particularly restricted, and examples thereof include an operation of touching a protrusion with a fingertip for a prescribed period of time (so-called press-and-hold operation) and an operation of touching a protrusion with a fingertip for a prescribed number of times in a prescribed period of time (so-called tapping operation).

Next, Operation Examples 1 to 4 of the position determination unit 11a will be described referring to the drawings.

Figure 5:
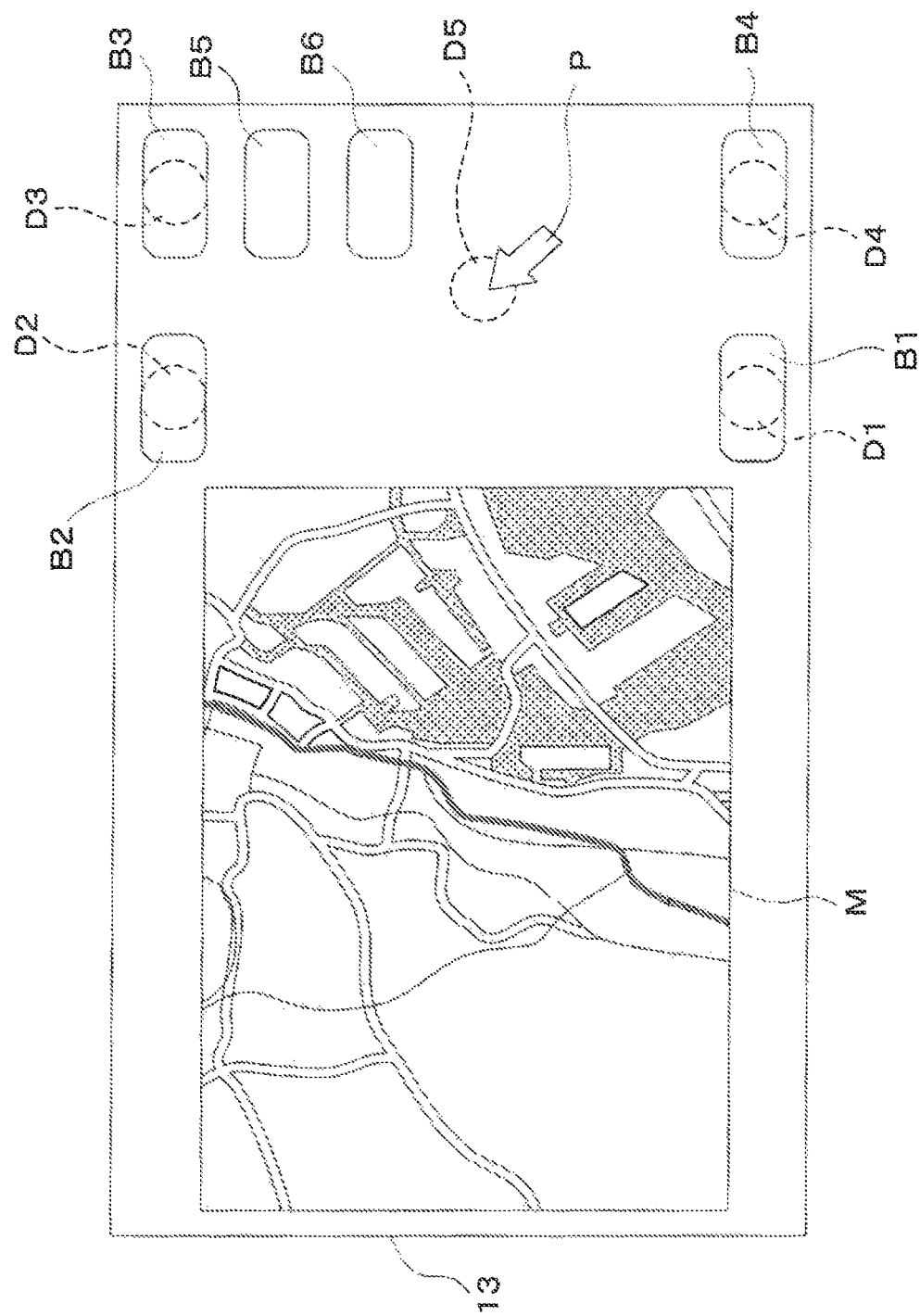
FIG. 5 illustrates Operation Example 1 of a position determination unit.

FIG. 5 illustrates Operation Example 1 of the position determination unit.

In the example illustrated in FIG. 5, the positional relationship between the map M and the operation buttons B1 to B6 that are displayed on the display unit 13 is different from that of the example illustrated in FIG. 4. In FIG. 5, the map M is arranged biased toward the left side of the screen while the operation buttons B1 to B6 are arranged biased toward the right side of the screen, making the operation region on the screen where the operation buttons B1 to B6 are arranged different from that of the example illustrated in FIG. 4.

Since the positions of the marks D1 to D5 on the screen that correspond to the protrusions 31a to 31e, respectively, are also changed in accordance with the change in the operation region on the screen, it is enable to easily move the pointer to a prescribed operation button. It is noted here, however, that the positional relationship of the marks D1 to D5 on the screen is the same as that of the five protrusions 31a to 31e on the planar sensor unit 30a.

Figure 6A:
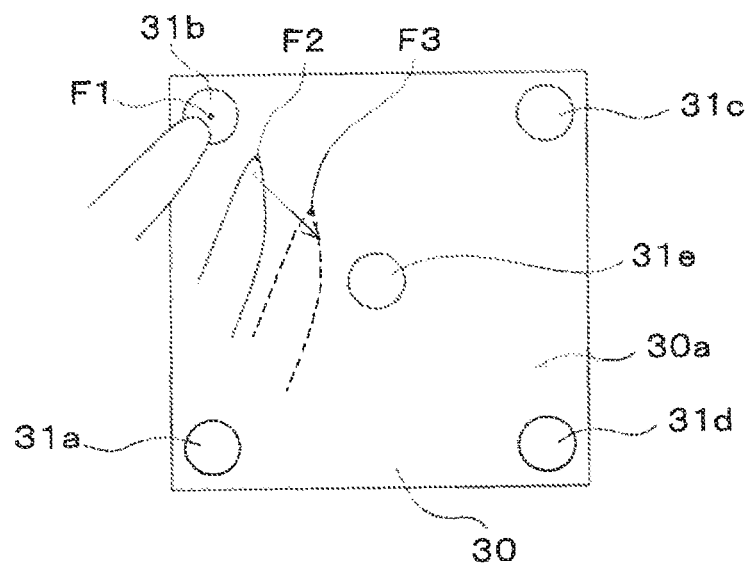
FIG. 6A illustrates Operation Example 2 of the position determination unit.
Figure 6B:
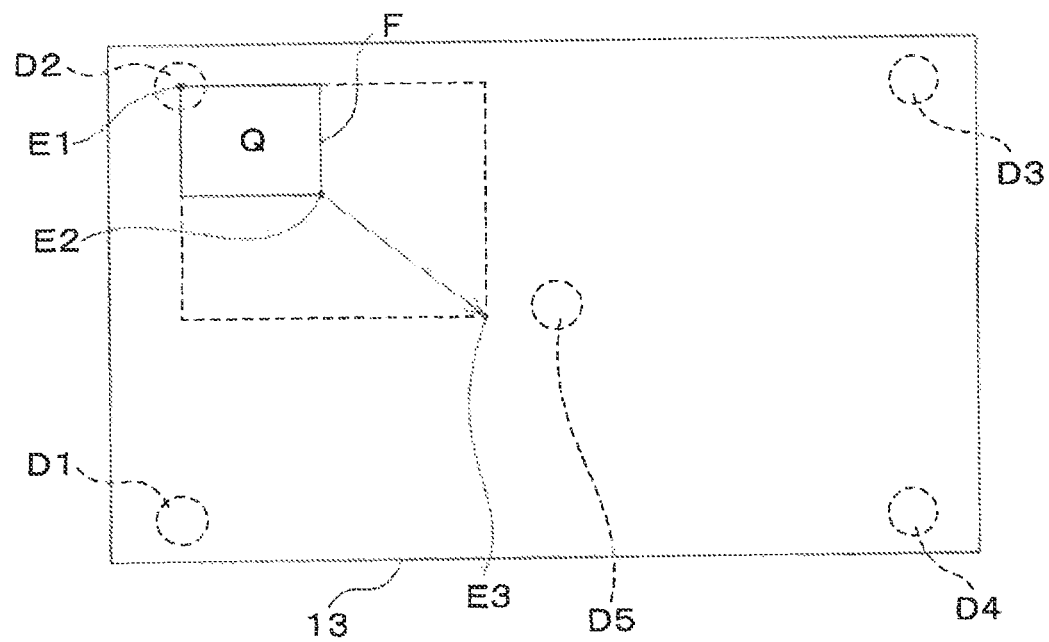
FIG. 6B illustrates Operation Example 2 of the position determination unit.

FIGS. 6A and 6B illustrate Operation Example 2 of the position determination unit.

The position determination unit 11a is capable of inputting a so-called pinch-out operation using the planar sensor unit 30a.

As illustrated in FIG. 6A, the user performs this operation in such a manner that, while performing a prescribed operation on the protrusion 31b with one finger, the user slides other finger over a prescribed area between the protrusion 31b and the protrusion 31e (from a position F2 to a position F3).

As a result of this operation, the position determination unit 11a, on the basis of the position F1 on the planar sensor unit 30a that corresponds to the protrusion 31b and the position F2 initially touched by the other finger, determines a specific position E1 and other position E2 that correspond to the positions F1 and F2, respectively, on the screen. Further, the position determination unit 11a, on the basis of the position F3 touched by the other finger in the end, determines a position E3 corresponding thereto on the screen. Then, the position determination unit 11a displays, on the screen of the display unit 13, an image of an area Q, which has the thus determined specific position E1 and the position E2 as diagonal points, in an enlarged manner over an area determined by the specific position E1 and a position E3 as diagonal points. Further, an image of the area other than the selected area Q is also displayed on the screen of the display unit 13 in an enlarged manner along with the enlarged image of the area Q. The position determination unit 11a may also move the pointer P to the specific position D1 on the screen in conformity with the above-described process.

In the above-described pinch-out operation, the protrusion on which a prescribed operation is performed using one finger may be a protrusion other than the protrusion 31b. Further, the position initially touched by other finger may also be other protrusion.

Figure 7:
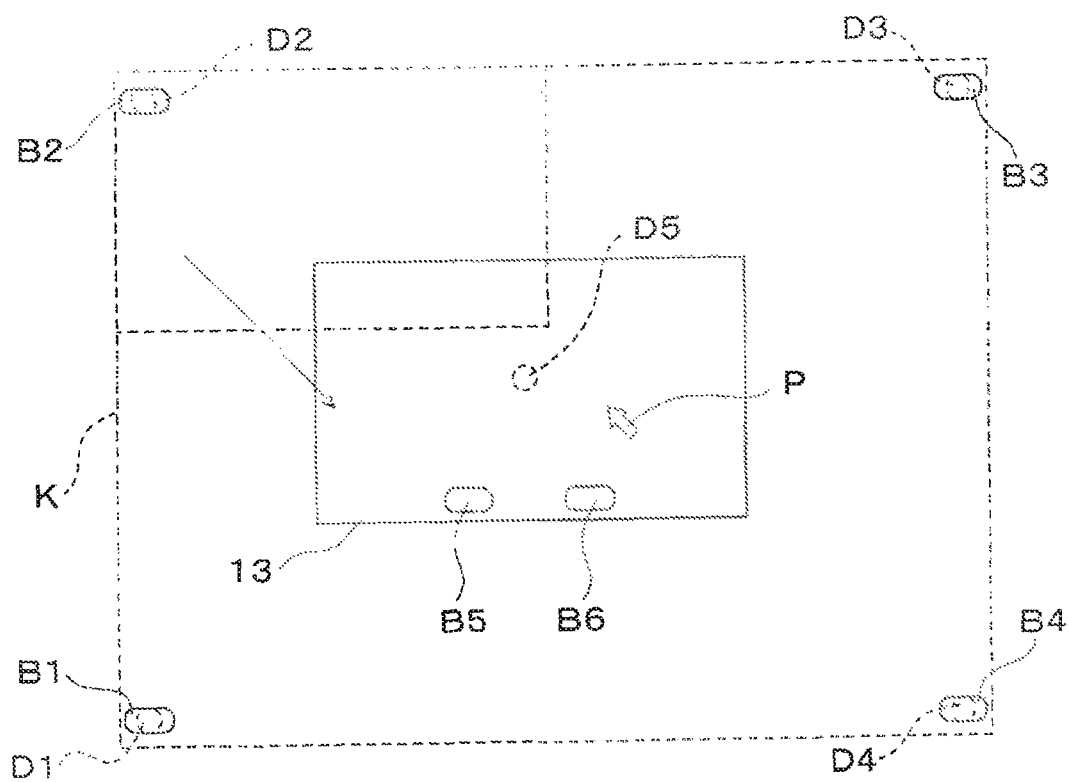
FIG. 7 illustrates Operation Example 3 of the position determination unit.

FIG. 7 illustrates Operation Example 3 of the position determination unit.

In the example illustrated in FIG. 7, the control unit 11 generates a virtual screen K, and the screen displayed on the display unit 13 constitutes a part of the virtual screen K. Other parts of the virtual screen K are not displayed on the display unit 13.

At the four corners of the virtual screen K, the operation buttons B1 to B4 and the marks D1 to D4 which correspond to the protrusions 31a to 31d, respectively, are arranged.

For example, when the user performs a prescribed operation on the protrusion 31b of the planar sensor unit 30a, the position determination unit 11a moves the pointer P to a preset specific position D2 on the screen and causes the display unit 13 to display its screen in such a manner to include the region of the virtual screen K where the pointer P has been moved to. In this manner, by operating the protrusion, the pointer P can be easily moved to a prescribed position in the virtual screen that is not displayed on the screen of the display unit 13. It is noted here that the relationship between the operation buttons B1 to B4 of the virtual screen K and the protrusions 31a to 31d of the planar sensor unit 30a is set in advance. For example, when a map is displayed on the display unit 13, the operation buttons B1 to B4 may be arranged on the virtual screen K at the positions away from the center of the screen, which is the current location, by twice the distance from the center of the screen to the respective four corners of the display unit 13.

Figure 8:
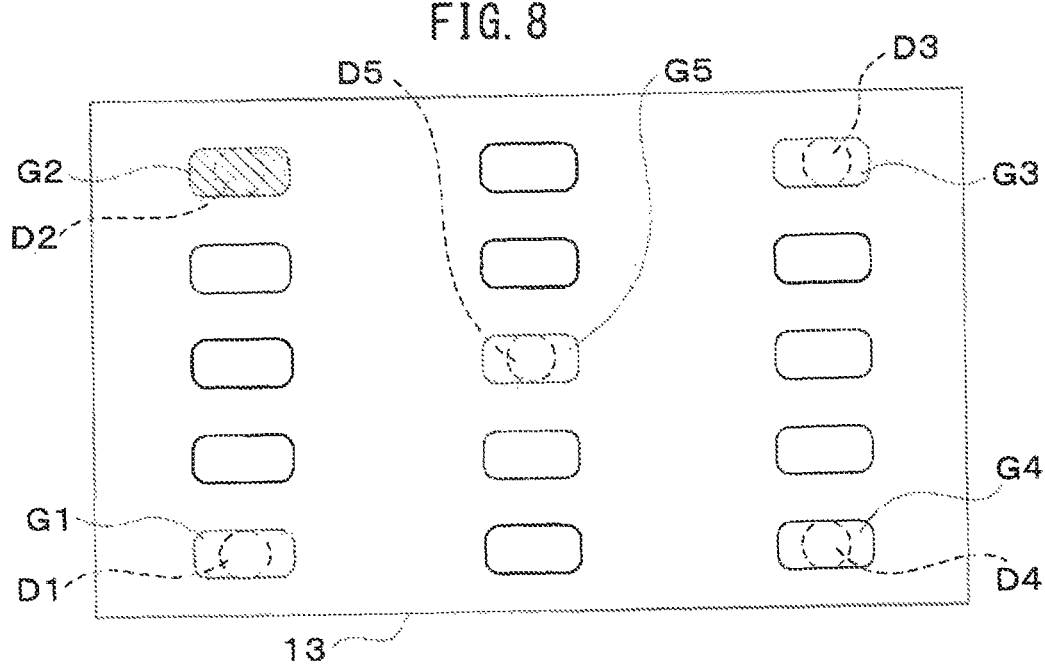
FIG. 8 illustrates Operation Example 4 of the position determination unit.

FIG. 8 illustrates Operation Example 4 of the position determination unit.

On the screen of the display unit 13, plural operation buttons which operate the onboard device 10 are displayed. The plural operation buttons are used for operating a prescribed application executed by the onboard device 10.

The position determination unit 11a modifies the figure at a specific position on the screen, which position is determined on the basis of a prescribed operation performed on the protrusion 31a to 31e of the planar sensor unit 30a, and thereby displays an indicator.

Specifically, when the user performs a prescribed operation on one of the protrusions 31a to 31e of the planar sensor unit 30a, the position determination unit 11a modifies the corresponding operation button G1 to G5 as a figure arranged at the position of the corresponding mark D1 to D5 (e.g., modification of the shape, size and/or color, blinking of the figures, or display of a selection frame) and displays an indicator.

For example, when the user performs a prescribed operation on the protrusion 31b of the planar sensor unit 30a, the position determination unit 11a can modify the operation button G2, which is arranged at a specific position on the screen as determined corresponding to the protrusion 31b, and thereby notify the user that the operation button G2 has been selected.

In this Operation Example, the position determination unit 11a functions as an input module of a prescribed application executed by the onboard device 10.

According to the onboard device 10 of the present embodiment which contains the input system 10a, a specific position on the screen of the display unit 13 can be easily determined and the operability of the prescribed application can thus be improved. Therefore, the time in which the user's line of sight is shifted from the ahead to the inside of the vehicle can be eliminated or greatly reduced, and this enables the user to operate the onboard device 10 without losing his/her attention to the driving of the vehicle.

Further, according to the onboard device 10 of the present embodiment which contains the input system 10a, the pointer P can be moved to a specific position on the screen on the basis of a prescribed operation performed on the protrusions 31a to 31e of the planar sensor unit 30a. For example, even in a conventional planar sensor unit, a pointer could be moved to a desired position by sliding a fingertip. However, in order to move a pointer from one edge of the screen to the edge on the other side, since it is necessary to repeatedly perform an action of sliding a fingertip on the planar sensor unit, the user's attention for driving the vehicle could potentially be reduced. On the other hand, in the present embodiment, the absolute position of the point P can be largely moved on the screen by simply performing a prescribed operation on any of the protrusions 31a to 31e of the planar sensor unit 30a; therefore, such a reduction in the user's attention for driving the vehicle can be inhibited.

Next, Modification Examples 1 to 3 of the planar sensor unit will be described referring to the drawings.

Figure 9:
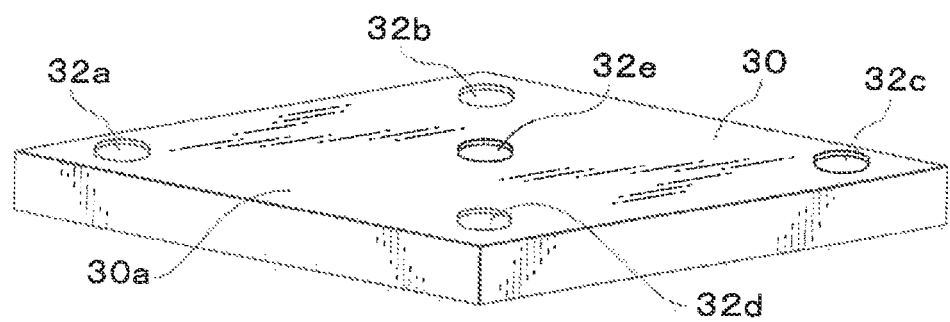
FIG. 9 illustrates Modification Example 1 of the planar sensor unit.

FIG. 9 illustrates Modification Example 1 of the planar sensor unit.

In this modification example, the detection device 30 includes: the planar sensor unit 30a, which is a planar touch sensor; and recesses 32a to 32e, which are arranged at prescribed regions on the planar sensor unit 30a and constitute the tactile sensation modification unit 30c that gives a tactile sensation different from that of the planar sensor unit 30a. The recesses 32a to 32e are each depressed inwardly from the surface of the planar sensor unit 30a. The user, while sliding his/her fingertip on the planar sensor unit 30a, can recognize that the fingertip has come into contact with the recesses 32a to 32e by touching them.

Figure 10A:
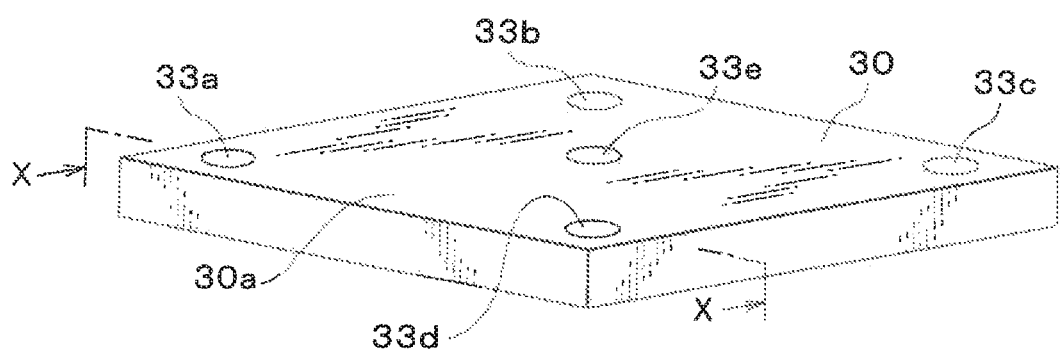
FIG. 10A illustrates Modification Example 2 of the planar sensor unit.
Figure 10B:
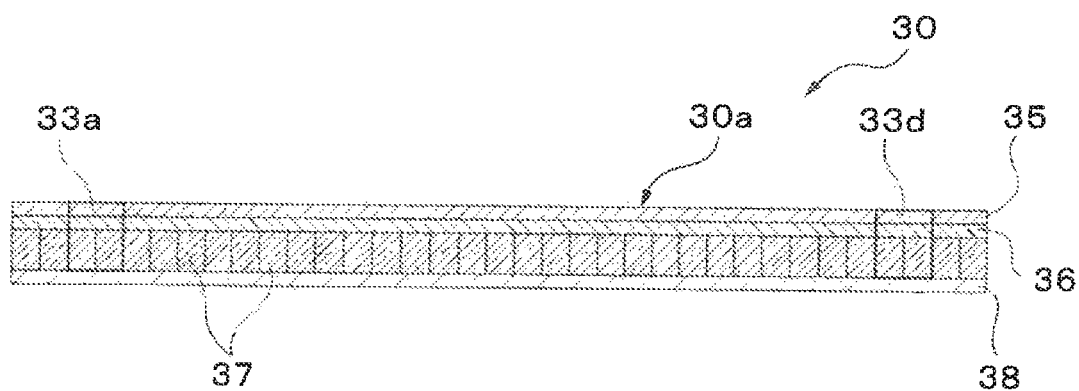
FIG. 10B is an enlarged cross-sectional view taken along a line X-X of FIG. 10A.

FIG. 10A is a perspective view illustrating Modification Example 2 of the planar sensor unit, and FIG. 10B is an enlarged cross-sectional view of FIG. 10A taken along a line X-X.

In the detection device 30, the tactile sensation modification unit 30c modifies the frictional coefficient of prescribed regions 33a to 33e such that the prescribed regions 33a to 33e have a tactile sensation different from that of other regions.

As the tactile sensation modification unit 30c which modifies the tactile sensation of the prescribed regions 33a to 33e, for example, piezoelectric elements can be used. The detection device 30 includes: plural piezoelectric elements 37, which are arranged in a two-dimensional array form on a substrate 38; an electroconductive layer 36, which is arranged on the two-dimensional array-form plural piezoelectric elements 37; and an insulating layer 35, which is arranged on the electroconductive layer 36. By allowing the two-dimensional array-form plural piezoelectric elements 37 to vibrate at a prescribed frequency (e.g., in an ultrasonic frequency range), the frictional coefficient can be kept low when the user slides his/her fingertip on the planar sensor unit 30a. When the user slides his/her fingertip on the planar sensor unit 30a and positions the fingertip in one of the prescribed regions 33a to 33e, the detection device 30 can allow the user to recognize that his/her fingertip has come into contact with the one of prescribed regions 33a to 33e by stopping the vibration of the piezoelectric elements arranged in the prescribed regions 33a to 33e and thereby increasing the frictional coefficient of the prescribed regions 33a to 33e. The planar sensor unit 30a is constituted by the electroconductive layer 36, the insulating layer 35, and a wiring (not illustrated) connected to the four corners of the electroconductive layer. In the example illustrated in FIG. 10B, the electroconductive layer 36 is arranged on the two-dimensional array-form plural piezoelectric elements 37; however, the electroconductive layer 36 may also be arranged underneath the two-dimensional array-form plural piezoelectric elements 37. The actions of the plural piezoelectric elements 37 are controlled by the position determination unit 11a via the input unit 16.

Alternatively, the frictional coefficient when the user slides his/her fingertip on the planar sensor unit 30a may be kept low by allowing the entire surface of the planar sensor unit 30a to vibrate at a prescribed frequency using one or plural piezoelectric elements. In this case as well, when the user slides his/her fingertip on the planar sensor unit 30a and positions the fingertip in one of the prescribed regions 33a to 33e, the detection device 30 can allow the user to recognize that his/her fingertip has come into contact with the one of prescribed regions 33a to 33e by stopping the vibration of the one or plural piezoelectric elements and thereby increasing the frictional coefficient of the entire surface of the planar sensor unit 30a. By driving the piezoelectric elements 37 in a low frequency band (in a several tens to several hundreds Hz band), the user is allowed to feel the vibration itself and to distinguish the difference in vibration frequency or the difference in vibration pattern, such as the intensity or on/off of the vibration. Thus, the vibration frequency or the vibration pattern may be changed to allow the user to recognize that his/her fingertip has come into contact with one of the prescribed regions 33a to 33e.

Figure 11:
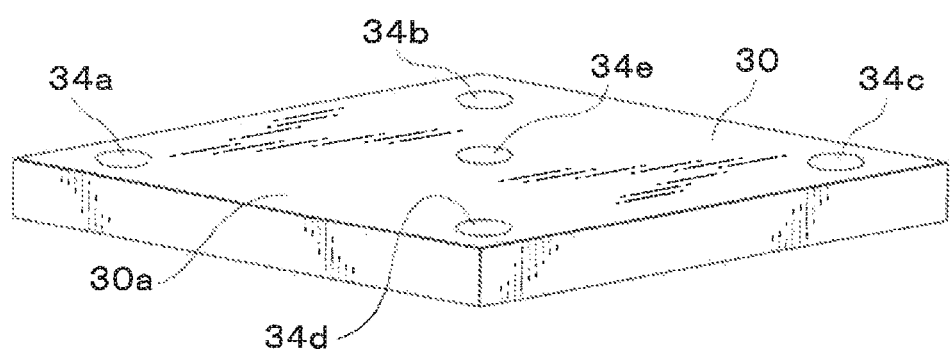
FIG. 11 illustrates Modification Example 3 of the planar sensor unit.

FIG. 11 illustrates Modification Example 3 of the planar sensor unit.

In the detection device 30, the tactile sensation modification unit 30c modifies the temperature of prescribed regions 34a to 34e such that the prescribed regions 34a to 34e have a tactile sensation different from that of other regions.

As the tactile sensation modification unit 30c which modifies the temperature of the prescribed regions 34a to 34e, for example, thermoelectric transducers can be used. The temperature of the prescribed regions 34a to 34e can be made higher or lower than that of other regions by arranging plural thermoelectric transducers in a two-dimensional array form on the planar sensor unit 30a. When the user slides his/her fingertip on the planar sensor unit 30a and positions the fingertip in one of the prescribed regions 34a to 34e, the user can sense a change in temperature with the fingertip and thereby recognize that the fingertip has come into contact with the one of prescribed regions 34a to 34e. The thermoelectric transducers may be arranged only in the prescribed regions 34a to 34e. Alternatively, the tactile sensation modification unit 30c may modify the thermal conductivity of the prescribed regions 34a to 34e to be different from that of other regions and thereby allow the user to recognize that his/her fingertip has come into contact with one of the prescribed regions 34a to 34e. By modifying the thermal conductivity of the prescribed regions 34a to 34e to be higher than that of other regions, the tactile sensation of the prescribed regions 34a to 34e can be made cold. Further, by modifying the thermal conductivity of the prescribed regions 34a to 34e to be lower than that of other regions, the tactile sensation of the prescribed regions 34a to 34e can be made warm. The actions of the plural thermoelectric transducers are controlled by the position determination unit 11a via the input unit 16.

In the present invention, the input system, detection device, control device, computer-readable non-transitory storage medium and method according to the above-described embodiments can be modified as appropriate, as long as the modification does not depart from the gist of the present invention.

For example, in the above-described embodiments, the functions of the input system are realized by cooperation of the detection device with the position determination unit of the control unit and the input unit of the onboard device; however, the functions of the position determination unit and input unit may be realized using an electronic device separate from the onboard device.

In addition, the input system is mounted on a vehicle in the above-described embodiments; however, the input system does not have to be mounted on a vehicle.

Further, the detection device may also include a detection sensor which detects gesture operations made by the user. The detection sensor acquires the movement track of the user's hand or other body part using a CCD or the like. Then, when the movement track of the user's body is determined to indicate an operation performed at a prescribed position in the space, a control means implemented by a programmed processor determines the display position of an indicator on the screen of a display device as a specific position. The prescribed position in the space can be, for example, a rib (protrusion) arranged between the driver's seat and the passenger seat.

Moreover, in the above-described embodiments and Modification Examples, a specific position on the screen of the display device is determined on the basis of a prescribed position on the planar sensor unit that is a detection sensor; however, a specific position on the screen of the display device does not have to be determined on the basis of a prescribed position on the detection sensor. For example, a specific position on the screen of the display device can be a position on the screen which has been determined in advance for a certain user operation performed at a prescribed position.

The invention claimed is:

1. An input system of a vehicle comprising: a display device having a screen configured to display subparts of a virtual screen that is larger than the screen; a detection device including: (i) a planar touch configured to detect a user operation, and being arranged apart from the display device, and (ii) an output circuit configured to output the detected user operation; and a control device including: an input device configured to input an amount of the detected user operation, and a processor programmed to: move the display position of an indicator on the screen of the display device from a current position in accordance with the input amount of the detected user operation, and when the input amount of the detected user operation is judged as corresponding to a prescribed operation performed at a prescribed position on the planar touch sensor, automatically change the display position of the indicator on the screen of the display device from: (a) the current position of the indicator that is in a first subpart of the virtual screen currently displayed in the display device, to (b) a second subpart of the virtual screen that is not displayed in the screen of the display device without any relation to the current position of the indicator, wherein: the prescribed operation on the planar touch sensor includes: manipulating a protrusion arranged at the prescribed position on the planar touch sensor, manipulating a recess arranged at the prescribed position on the planar touch sensor, making a friction coefficient of the prescribed position on the planar touch sensor being different from that of other regions, making a temperature of the prescribed position on the planar touch sensor being different from that of other regions, or making a thermal conductivity of the prescribed position on the planar touch sensor being different from that of other regions.

2. The input system according to claim 1, wherein
the processor determines a position on the planar touch sensor at which the user operation is performed on the basis of the detected user operation, and
when the input amount of the detected user operation is judged as corresponding to an operation performed at the prescribed position, the processor determines the specific position on the screen of the display device on the basis of the determined position on the planar touch sensor.

3. The input system according to claim 1, wherein the indicator is a pointer, and
the processor moves the pointer to the specific position on the screen of the display device on the basis of the prescribed position.

4. The input system according to claim 1, wherein the processor displays the indicator by changing a figure arranged at the specific position on the screen of the display device on the basis of the prescribed position.

5. The input system according to claim 1, wherein the specific position on the screen of the display device changes in accordance with an operation region on the screen of the display device.

6. The input system according to claim 1, wherein
the specific position on the screen of the display device is determined in advance, and
the specific position determined in advance on the screen of the display device is displayed on the screen of the display device.

7. The input system according to claim 1, wherein
the input system is mounted on a vehicle, and
when the input amount of the detected user operation is judged as corresponding to an operation performed at the prescribed position, the processor changes the display position of the indicator on the screen of the display device mounted on the vehicle from the current position to the specific position.

8. A detection device for use with a display device of a vehicle having a screen configured to display subparts of a virtual screen that is larger than the screen, the detection device comprising; a planar touch sensor configured to detect a user operation, the planar touch sensor being arranged apart from the display device; an output circuit configured to output the detected user operation; and a processor programmed to: move the display position of an indicator on the screen of the display device from a current position in accordance with an amount of the detected user operation, and when the detected user operation is judged as corresponding to a prescribed operation performed at a prescribed position on the planar touch sensor, automatically change the display position of the indicator on the screen of the display device from: (a) the current position of the indicator that is in a first subpart of the virtual screen currently displayed in the display device, to (b) a second subpart of the virtual screen that is not displayed in the screen of the display device without any relation to the current position of the indicator, wherein: the prescribed operation on the planar touch sensor includes: manipulating a protrusion arranged at the prescribed position on the planar touch sensor, manipulating a recess arranged at the prescribed position on the planar touch sensor, making a friction coefficient of the prescribed position on the planar touch sensor being different from that of other regions, making a temperature of the prescribed position on the planar touch sensor being different from that of other regions, or making a thermal conductivity of the prescribed position on the planar touch sensor being different from that of other regions.

9. A control device for use with a display device of a vehicle having a screen configured to display subparts of a virtual screen that is larger than the screen, the control device comprising: an input device configured to input an amount of a detected user operation that is output by a detection device having: (i) a planar touch sensor configured to detect a user operation and is arranged apart from the display device, and (ii) an output circuit which outputs the detected user operation; and a processor programmed to: move the display position of an indicator on the screen of the display device from a current position in accordance with the input amount of the detected user operation, and when the input amount of the detected user operation is judged as corresponding to a prescribed operation performed at a prescribed position on the planar touch sensor, automatically change the display position of the indicator on the screen of the display device from: (a) the current position of the indicator that is in a first subpart of the virtual screen currently displayed in the display device, to (b) a second subpart of the virtual screen that is not displayed in the screen of the display device without any relation to the current position of the indicator, wherein: the prescribed operation on the planar touch sensor includes: manipulating a protrusion arranged at the prescribed position on the planar touch sensor, manipulating a recess arranged at the prescribed position on the planar touch sensor, making a friction coefficient of the prescribed position on the planar touch sensor being different from that of other regions, making a temperature of the prescribed position on the planar touch sensor being different from that of other regions, or making a thermal conductivity of the prescribed position on the planar touch sensor being different from that of other regions.

10. A non-transitory computer-readable storage medium storing a program for use with: (A) a processor, (B) a display device of a vehicle having a screen configured to display subparts of a virtual screen that is larger than the screen, and (C) a detection device having: (i) a planar touch sensor configured to detect a user operation and being arranged apart from the display device, and (ii) an output circuit configured to output the detected user operation, the program causing the processor to execute steps comprising: receiving the detected user operation from the output circuit; moving a display position of an indicator on the screen of the display device from a current position in accordance with the received amount of the user operation; and automatically changing the display position of the indicator on the screen of the display device from: (a) the current position of the indicator that is in a first subpart of the virtual screen currently displayed in the display device, to (b) a second subpart of the virtual screen that is not displayed in the screen of the display device without any relation to the current position of the indicator, in response to-the received amount of the detected user operation is judged as corresponding to a prescribed operation performed at a prescribed position on the planar touch sensor, wherein: the prescribed operation on the planar touch sensor includes: manipulating a protrusion arranged at the prescribed position on the planar touch sensor, manipulating a recess arranged at the prescribed position on the planar touch sensor, making a friction coefficient of the prescribed position on the planar touch sensor being different from that of other regions, making a temperature of the prescribed position on the planar touch sensor being different from that of other regions, or making a thermal conductivity of the prescribed position on the planar touch sensor being different from that of other regions.

11. A method for use with: (A) a processor, (B) a display device of a vehicle having a screen configured to display a virtual screen, and (C) a detection device having: (i) a planar touch sensor configured to detect a user operation and being arranged apart from the display device, and (ii) an output circuit configured to output the detected user operation detected by the planar touch sensor, the method comprising: receiving, from the output circuit, an amount of the detected user operation; moving, by the processor, a display position of an indicator on the screen of the display device from a current position in accordance with the received amount of the detected user operation, automatically changing, by the processor, the display position of the indicator on the screen of the display device from: (a) the current position of the indicator that is in a first subpart of the virtual screen currently displayed in the display device, to (b) a second subpart of the virtual screen that is not displayed in the screen of the display device without any relation to the current position of the indicator, in response to the received amount of the detected user operation is judged as corresponding to a prescribed operation performed at a prescribed position on the planar touch sensor, wherein: the prescribed operation on the planar touch sensor includes: manipulating a protrusion arranged at the prescribed position on the planar touch sensor, manipulating a recess arranged at the prescribed position on the planar touch sensor, making a friction coefficient of the prescribed position on the planar touch sensor being different from that of other regions, making a temperature of the prescribed position on the planar touch sensor being different from that of other regions, or making a thermal conductivity of the prescribed position on the planar touch sensor being different from that of other regions.

12. The input system according to claim 1, wherein when the display position of the indicator moves to the specific position that is not displayed in the first part of the virtual screen, the processor changes the screen of the display device to display an area of the virtual screen that includes the specific position.

\* \* \* \* \*